F. LENDER.
REVERSING GEARING.
APPLICATION FILED DEC. 27, 1911.

1,061,190.

Patented May 6, 1913.
2 SHEETS—SHEET 1.

Witnesses:
V. M. Hudson
Miriam Stern

Inventor
Francis Lender
Attorney

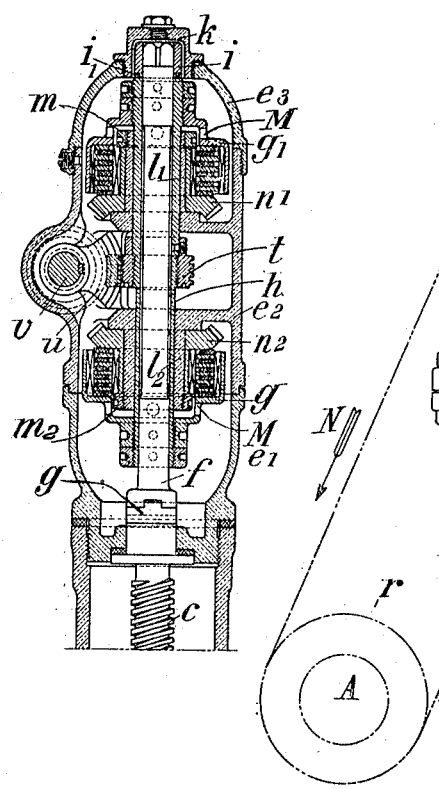
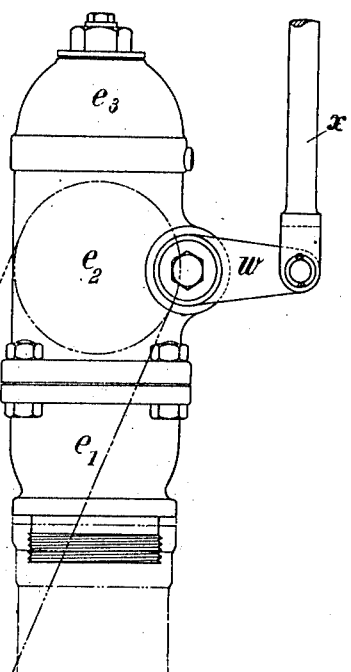
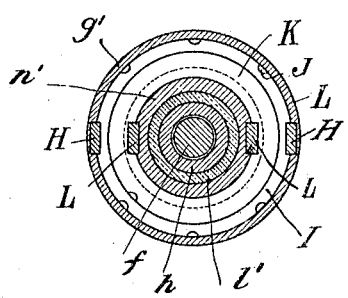
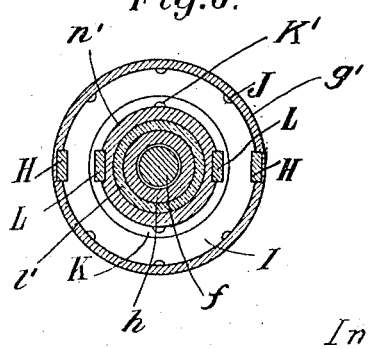

UNITED STATES PATENT OFFICE.

FRANCIS LENDER, OF ST. PETERSBURG, RUSSIA.

REVERSING-GEARING.

1,061,190.        Specification of Letters Patent.        Patented May 6, 1913.

Application filed December 27, 1911. Serial No. 668,157.

*To all whom it may concern:*

Be it known that I, FRANCIS LENDER, a subject of the Russian Emperor, and resident of St. Petersburg, Russia, have invented certain new and useful Improvements in Reversing-Gearing, of which the following is a specification.

The object of the invention is to provide a simple and effectual reversing gearing adapted to be operated to transmit rotary movement from a shaft which rotates constantly in one direction to a shaft which is to be rotated in either of two directions.

With the above object in view the structure includes casing sections connected together and in which is journaled a shaft. This shaft is operatively connected with a rod which in turn is operatively connected with the shaft which is to be rotated in either of two directions, a sleeve is fixed upon the first mentioned shaft and carries cups which contain friction rings. Bearings are provided for the reception of the sleeve and beveled gear wheels are journaled upon the bearings and are adapted to be engaged at different times by sets of friction rings so that one or the other of the said gear wheels is caused to rotate with the sleeve or vice-versa, the sleeve is caused to rotate with one or the other of the said beveled gear wheels. Means is provided for shifting the sleeve and the cups in order to cause one or the other of the set of rings to frictionally engage one of the beveled gear wheels. Another shaft is journaled in the casing and means is provided for rotating the last mentioned shaft constantly in one direction. A beveled gear wheel is carried at the inner end of the last mentioned shaft and meshes with both of the beveled gear wheels hereinbefore mentioned.

Figure 1:
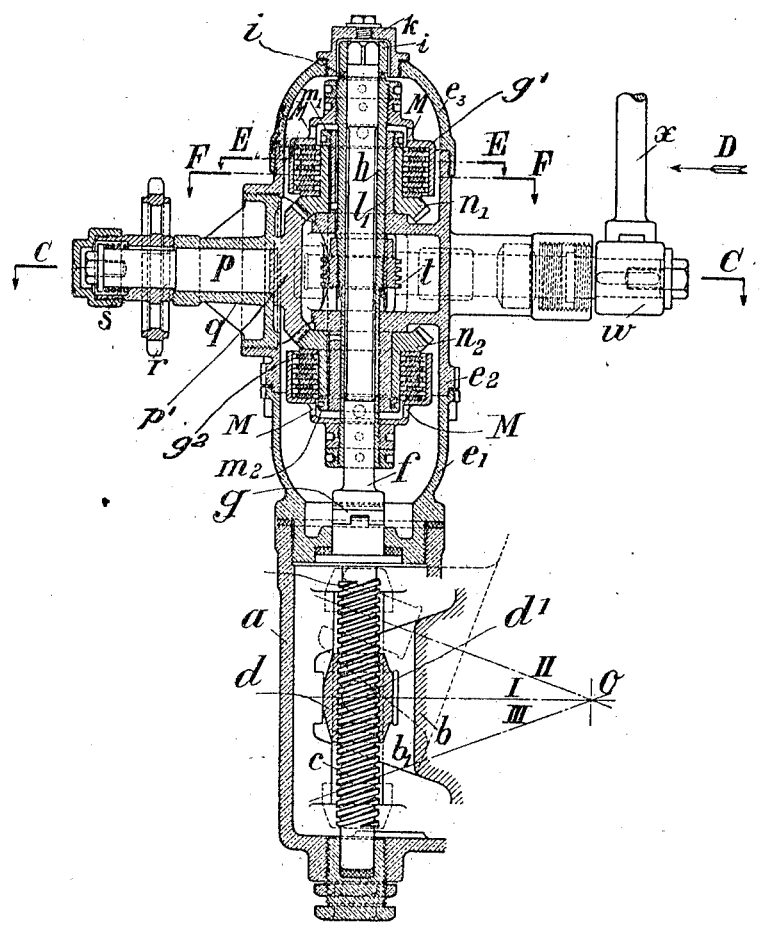
Figure 2:
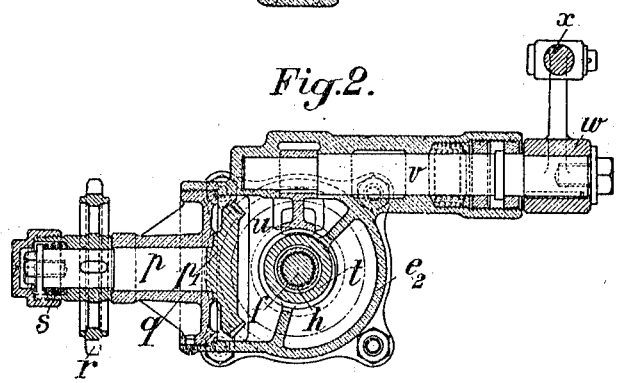

In the accompanying drawings:—Figure 1 is a vertical sectional view of the reversing gearing. Fig. 2 is a transverse sectional view of the same cut on the line C—C of Fig. 1 with a section taken through a rod of the mechanism at or about the point indicated by the arrow D in Fig. 1. Fig. 3 is a longitudinal sectional view of the gear taken at a right angle to the view illustrated in Fig. 1. Fig. 4 is a side elevation of the reversing gearing. Fig. 5 is a transverse sectional view of the gearing taken on the line E—E of Fig. 1. Fig. 6 is a similar view taken on the line F—F of Fig. 1.

The device includes casing sections $e^1$, $e^2$ and $e^3$ connected to each other in any suitable manner in the order in which they are named. A casing section $a$, is connected to the end of the casing section $e^1$. A rod $c$, is journaled in the casing section $a$, and is provided with an external thread which is engaged by a nut $d$. The nut $d$ is provided at its sides with gudgeons $d^1$ which lie between the branched ends of a fork $b^1$. The fork $b^1$ is connected in any suitable manner with the shaft the axis of which is indicated at O in Fig. 1 of the drawing. As the rod $c$ is rotated in one direction or the other, the nut $d$ is moved along the said rod. When the nut is in the position indicated at the line I in Fig. 1, it is located midway between the ends of the thread of the rod $c$ and at this time the rod $c$ is at a state of rest as will be hereinafter explained. Whenever the nut $d$ is in alinement with either of the lines II or III as indicated in Fig. 1, the rod $c$ is rotating in one direction or in an opposite direction or is brought to a state of rest as will be hereinafter explained. Bearings $l^1$, $l^2$, are located within the casing section $e^2$ and the sleeve $h$ is journaled in said bearings. A shaft $f$ is located in the sleeve $h$ and one end of the shaft $f$ is connected with the rod $c$, by means of a clutch device indicated at $g$ in Fig. 1. A ring $i$ is fixed to one end of the shaft $f$ and is provided at its inner edge with teeth which engage the end of the sleeve $h$. A cap $k$ closes one end of the casing section $e^3$ and houses the ring $i$. A beveled gear wheel $n^1$ is loosely journaled on the bearing $l^1$ and is held thereon by means of a nut $m^1$ which is screw threaded upon one end portion of the said bearing $l^1$. A cup $g^1$ is fixed to one end portion of the sleeve $h$ and is provided with oil ports M. Rings K and I are located in the cup $g^1$. The rings K are of metal and the rings I are made of fiber. These two kind of rings are alternately arranged and the inner edges of the rings K bear against the hub of the wheel $n^1$ and are provided with oil holes or notches $K^1$ and the rings K are held against rotation with relation to the wheel $n^1$ by means of blocks L which are inserted through registering recesses in the hub of the wheel $n^1$ and the set of rings K. The outer edges of the rings I bear against the inner surfaces of the cup $g^1$ and are held against rotation by means of blocks H which are inserted in registering recesses provided in the cup $g^1$ and the said rings I. The rings I are provided at their outer edges with oil holes or notches J. A cup $g^2$ is fixed to the inner end portion of the sleeve $h$ and is held by means of a nut $m^2$ which is screw threaded upon the said sleeve. The cup $g^2$ is provided with oil holes or ports M and the set of rings K and I as hereinbefore described in connection with the cup $g^1$ is located in the cup $g^2$ and is adapted to coöperate with the beveled gear wheel $n^2$ which is journaled upon the bearing $l^2$. A nut $t$ is fixed to the intermediate portion of the sleeve $h$ and is provided upon its exterior with teeth or a thread as clearly indicated in Figs. 1 and 3 of the drawing. A shaft $v$ is journaled in the casing section $e^2$ and is provided with fixed teeth $u$ which engage the teeth or thread of the nut $t$. An arm $w$ is fixed to the outer end of the shaft $v$ and is connected with an operating rod $x$. A shaft $p$ is journaled in the bearing $q$ which is attached to the side of the casing section $e^2$ and the beveled gear wheel $p^1$ is carried by the inner end of the shaft $p$. This wheel $p^1$ meshes with both of the wheels $n^1$ and $n^2$. A spring $s$ is interposed between the shoulder provided at the outer end of the shaft $p$ and is under tension with a tendency to hold the outer side of the wheel $p^1$ in close contact with the inner end of the bearing $q$. Sprocket wheel $r$ is fixed to the shaft $p$ and is adapted to be driven by a chain indicated at N in Fig. 4 from a shaft A. The shaft A rotates constantly in one direction and through the chain N the shaft $p$ is constantly rotated in a corresponding direction.

The parts are so arranged that when the arm $w$ is disposed at a right angle to the length of the casing made up of the sections $e^1$, $e^2$, and $e^3$ as shown in Fig. 4 of the drawing the nut $d$ will be in the position indicated at the line I in Fig. 1 of the drawing. The parts may be brought to this adjustment by properly positioning the ring $i$ upon the shaft $f$ so that the teeth $i^1$ of the said ring engages the end of the sleeve $h$. In other words the ring $i$ is used to adjustably fix the shaft $f$ with relation to the sleeve $h$.

When the rod $x$ is moved longitudinally in one direction the arm $w$ is swung, which in turn partially rotates the shaft $v$. The teeth $u$ carried by the shaft $v$ move the nut $t$, which in turn moves the sleeve $h$ and the shaft $f$ so that one or the other of the series of rings carried by the cups $g^1$ or $g^2$ will frictionally engage the adjacent wheel $n^1$ or $n^2$. These wheels $n^1$ and $n^2$ constantly rotate, inasmuch as they mesh with the wheel $p^1$ carried by the inner end of the shaft $p$ or inasmuch as they engage the wheels $p^1$ at opposite sides, the said wheels $n^1$ and $n^2$ rotate in opposite directions. Consequently when the rings carried in the cup $g^1$ frictionally engage the wheel $n^1$ the sleeve $h$ and shaft $f$ are rotating in one direction. But when the rings carried in the cup $g^2$ are brought into frictional engagement with the wheel $n^2$, the sleeve $h$ and the shaft $f$ are rotating in an opposite direction. Inasmuch as the rod $c$ rotates in unison with the shaft $f$, the nut $d$ will be moved by the thread of the rod $c$ toward one end or the other of the said rod and consequently the shaft whose axis is indicated at $o$ is turned in one direction or the other. This shaft may be that of a rotor or steering mechanism and the rod $x$ may be moved longitudinally to cause the reversing of the movement from the shaft $p$ to the shaft $f$ as hereinbefore indicated. It is of course to be understood that the movement of the sleeve $h$ and the shaft $f$ is very slight, as it requires only just enough movement to bind one or the other of the said friction rings against the wheels $n^1$ or $n^2$.

The oil ports or notches hereinbefore mentioned are adapted to permit the parts to be lubricated during their operation as the casing of which the sections $e^1$, $e^2$ and $e^3$ are components are filled with oil.

Having described the invention what is claimed, is:

1. Reversing gearing comprising a casing having bearings located therein, a sleeve journaled in the bearings, a shaft located in the sleeve and adjustably connected to the same, means for moving the sleeve longitudinally, wheels journaled upon the bearings, cups fixed to the sleeve, friction rings located in the cups adjacent the said wheels, a shaft journaled in the casing for rotation in one direction and a wheel carried by the last mentioned shaft and engaging the first mentioned wheels.

2. Reversing gearing comprising a casing, bearings located in the casing, a sleeve journaled in the bearings and located in the casing, a nut fixed to the sleeve, and provided with teeth, a shaft journaled in the casing and having teeth which engage the teeth of the nut, means for turning the last mentioned shaft, a shaft located within the sleeve, wheels journaled upon the bearings, cups fixed to the sleeve, friction rings carried by the cups and adapted to engage the said wheels, a shaft journaled for rotation in one direction and a wheel carried by the last mentioned shaft and engaging the first mentioned wheels.

3. Reversing gearing comprising a casing, bearings located in the casing, a sleeve journaled in the bearings, a shaft located in the sleeve, a ring adjustably attached to the shaft and having teeth which engage the sleeve, wheels journaled upon the bearings, cups carried by the sleeve, friction rings located in the cups and adapted to operate against the said wheels, means for moving the sleeve longitudinally, a shaft journaled in the casing for rotation in one direction only and a wheel carried by the last mentioned shaft and engaging the first mentioned wheels.

In testimony whereof I have hereunto set my hand in presence of two witnesses.

FRANCIS LENDER.

Witnesses:
H. A. LOVIAGUIRE,
H. L. MOLCURYNSKO.